United States Patent
Spykerman

(10) Patent No.: US 6,390,547 B1
(45) Date of Patent: May 21, 2002

(54) SEAT ASSEMBLY

(75) Inventor: David J. Spykerman, Zeeland, MI (US)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 09/479,025

(22) Filed: Jan. 7, 2000

(51) Int. Cl.$^7$ ................................................ A47C 7/62
(52) U.S. Cl. ........................ 297/188.1; 296/37.15; 297/188.11; 297/331
(58) Field of Search ...................... 297/188.1, 188.01, 297/188.08, 188.09, 188.11, 188.13, 188.2, 188.21, 331, 321, 320, 337, 344.22, 350, 13; 296/37.15, 65.05

(56) References Cited

U.S. PATENT DOCUMENTS

| | | | | |
|---|---|---|---|---|
| 960,360 A | * | 6/1910 | Lynch | ................... 297/188.02 |
| 1,403,543 A | * | 1/1922 | Daniel | ............... 297/188.11 X |
| 1,600,977 A | | 9/1926 | Dameron | |
| 1,829,486 A | * | 10/1931 | Kimbrig et al. | ....... 297/188.02 |
| 3,059,964 A | | 10/1962 | Hoppe et al. | |
| 4,157,797 A | | 6/1979 | Fox | |
| 4,624,502 A | * | 11/1986 | Boole | ..................... 297/188.11 |
| 4,771,507 A | | 9/1988 | Draplin et al. | |
| 5,039,155 A | | 8/1991 | Suman et al. | |
| 5,106,144 A | | 4/1992 | Hayakawa et al. | |
| 5,707,103 A | * | 1/1998 | Balk | ...................... 297/331 X |
| 5,816,650 A | * | 1/1998 | Lucas, Jr. | ................ 297/188.1 |
| 5,902,009 A | | 5/1999 | Singh et al. | |
| 5,927,800 A | * | 7/1999 | Stallworth | ......... 297/188.12 X |
| 6,042,180 A | * | 3/2000 | Lombardi | ............... 297/188.11 |
| 6,161,896 A | * | 12/2000 | Johnson et al. | .......... 297/188.1 |

* cited by examiner

Primary Examiner—Peter R. Brown
Assistant Examiner—Stephen Vu
(74) Attorney, Agent, or Firm—Foley & Lardner

(57) ABSTRACT

A seat assembly for a vehicle having a seat cushion being connected to the vehicle for pivotal movement about a first axis and a seat back being connected to the seat cushion for rotational movement about a second axis. When the seat cushion is pivoted about the first axis from a generally horizontal position to a generally vertical position, the seat cushion is displaced in a rearward and upward direction and the seat back is displaced in a rearward and downward direction.

16 Claims, 2 Drawing Sheets

SEAT ASSEMBLY

TECHNICAL FIELD OF THE INVENTION

This invention generally relates to a seat assembly for a vehicle. More specifically, this invention relates to a seat assembly for a vehicle in which the seat cushion may be pivoted about a first axis from a generally horizontal position to a generally vertical position, and a bottom portion of the seat back may be displaced in a rearward and downward direction.

BACKGROUND

One of the recent innovations associated with pickup truck design is the development of the extended cab with a second row of forward-facing rear seats. If the overall vehicle length remains the same, placing a second row of seats in an extended cap pickup truck reduces the storage capacity of the bed of the pickup truck. That is, the presence of the rear seats interferes with the ability to store objects such as tool boxes, machine parts, and other cargo that require relatively flat surfaces for storage. While effort has been placed into designing seats that can be removed or rotated into a retracted position to thereby increase the useable space within the extended cap pickup truck, the resulting cargo floor space has, until now, been limited.

SUMMARY OF THE INVENTION

Accordingly, this invention provides for a seat assembly for a vehicle which overcomes the problems and disadvantages of the conventional techniques in the art. The invention also provides for a seat assembly for a vehicle that increases cargo floor space in a truck or van-type vehicle.

Briefly, the invention includes a seat assembly for a vehicle having a seat cushion being connected to the vehicle for pivotal movement about a first axis and a seat back being connected to the seat cushion for rotational movement about a second axis. When the seat cushion is pivoted about the first axis from a generally horizontal position to a generally vertical position, the seat cushion is displaced in a rearward and upward direction and the seat back is displaced in a rearward and downward direction.

Further features and advantages of the invention will become apparent from the following discussion and accompanying drawings.

DETAILED DESCRIPTION OF THE PREFERRED EMBODIMENT

The following description of the preferred embodiment is merely exemplary in nature, and is in no way intended to limit the invention or its application or uses.

Figure 1:
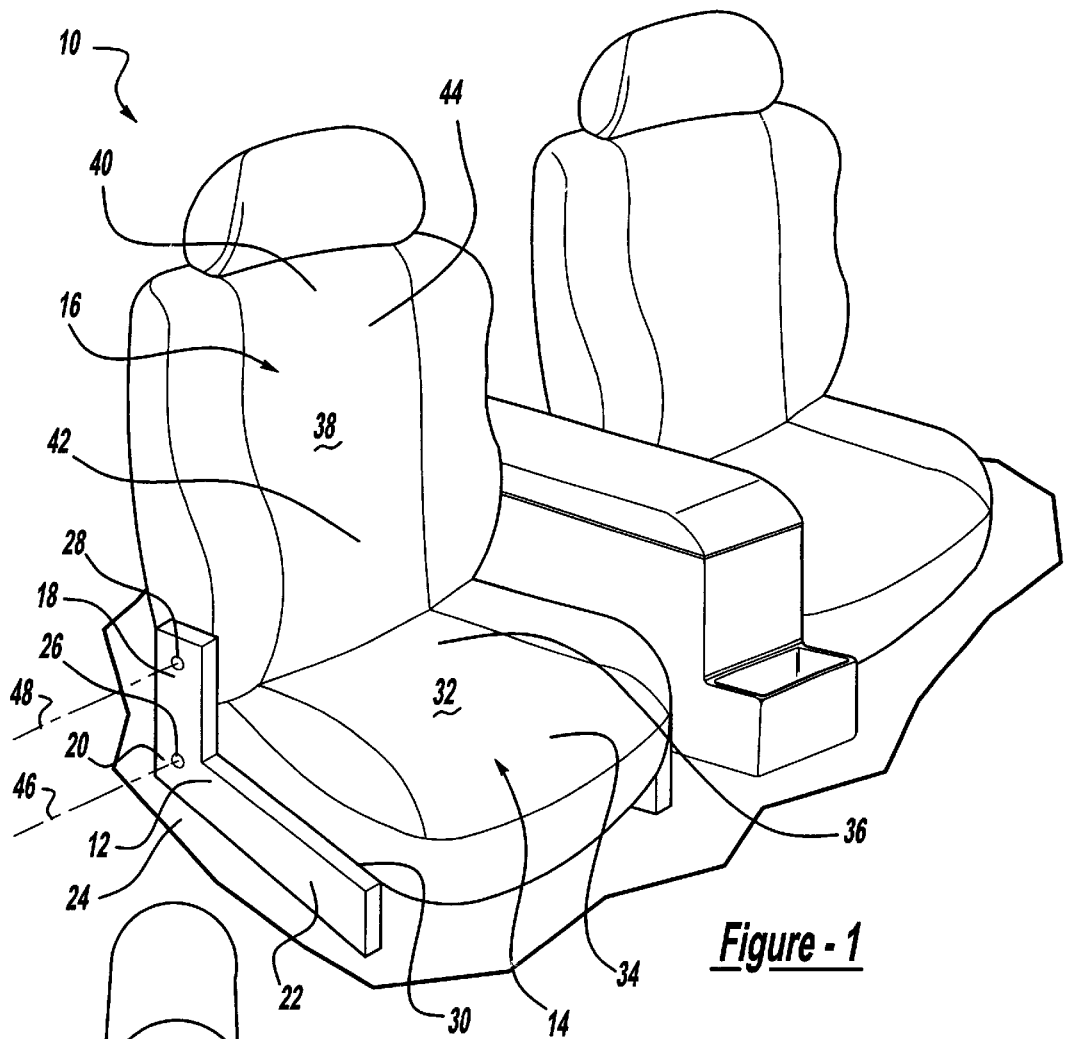
FIG. 1 is a perspective view of the preferred embodiment of the seat assembly.

As shown in FIG. 1, the seat assembly 10 of the invention includes an arm member 12, a seat cushion 14, and a seat back 16. Although the seat assembly 10 may be used in any vehicle, the seat assembly 10 of the invention is specifically designed to increase cargo floor space in a truck or van-type vehicle.

The arm member 12 connects the seat cushion 14 to the vehicle and connects the seat back 16 to the seat cushion 14. In the preferred embodiment, the arm member 12 is formed with an L-shape from a hard plastic material. In alternative embodiments, the arm member 12 may be formed with other suitable shapes and from other suitable materials. With the L-shaped configuration, the arm member 12 includes a first end section 18, a middle section 20, and a second end section 22. The middle section 20 of the arm member 12 is preferably removably connected to a floor 24 of the vehicle with a first pivot device 26. This feature allows the seat assembly 10 to be selectively removable from the interior of the vehicle, which is especially advantageous in van-type vehicles. The middle section 20 may alternatively be permanently connected to the floor 24 of the vehicle. The first end section 18 of the arm member 12 is connected to the seat back 16 by a second pivot device 28. The first pivot device 26 and the second pivot device 28 preferably include a conventional pin and socket arrangement, but may alternatively include other suitable devices and arrangements. The second end section 22 of the arm member 12 is connected to the seat cushion 14 with a fastener 30. The fastener 30 preferably includes a frame (not shown) that supports the seat cushion 14, but may alternatively include adhesives, screws, bolts, nails, or other suitable devices to secure the second end section 22 to the seat cushion 14.

The seat cushion 14 provides a sitting surface 32 for an occupant of the vehicle, and includes a front portion 34 and a rear portion 36. Likewise, the seat back 16 provides a resting surface 38 for the occupant, and includes a top portion 40 and a bottom portion 42. The seat cushion 14 and the seat back 16 are preferably formed from conventional materials and with conventional methods. As such, the seat cushion 14 and the seat back 16 preferably include a frame (not shown) to support the seat cushion 14 and the seat back 16, a foam cushion (not shown), and a trim cover 44 to contain the foam cushion and frame and to protect the foam cushion. The seat assembly 10, however, may be formed from other suitable materials, and with other suitable methods.

Figure 2:
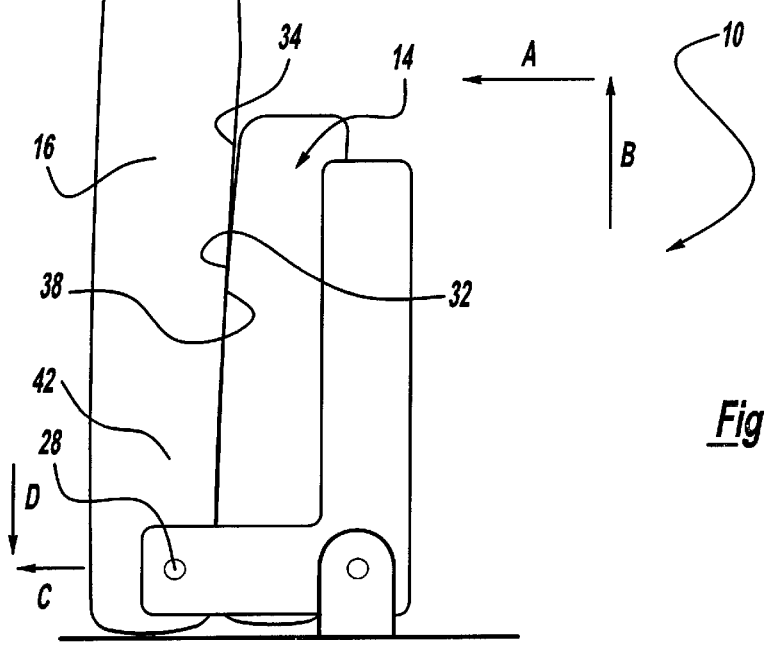
FIG. 2 is a side view of the seat assembly with the seat cushion in a generally vertical position.

The first pivot device 26 of the arm member 12 allows pivotal movement of the seat cushion 14 about a first axis 46 from a generally horizontal position, as shown in FIG. 1, to a generally vertical position, as shown in FIG. 2. During this pivotal movement, the front portion 34 of the seat cushion 14 is displaced in a rearward direction A and in an upward direction B. When the seat cushion 14 is pivoted into the generally vertical position, the second pivot device 28 allows displacement of the bottom portion 42 of the seat back 16 in a rearward direction C and in a downward direction D. During this displacement of the bottom portion 42 of the seat back 16, the seat back 16 is rotated slightly from an angled position to an upright position about a second axis 48 (shown in FIG. 1), which is displaced from and generally parallel with the first axis 46 (also shown in FIG. 1). For the most part, however, the seat back 16 remains substantially vertical during the displacement of the bottom portion 42 of the seat back 16. When the seat cushion 14 is pivoted into the generally vertical position and the seat back 16 is displaced in the rearward direction and the downward direction, the sitting surface 32 and resting surface 38 become substantially adjacent, which provides a compact configuration for the seat assembly 10 and provides extra cargo room for the interior of the vehicle.

Figure 3:
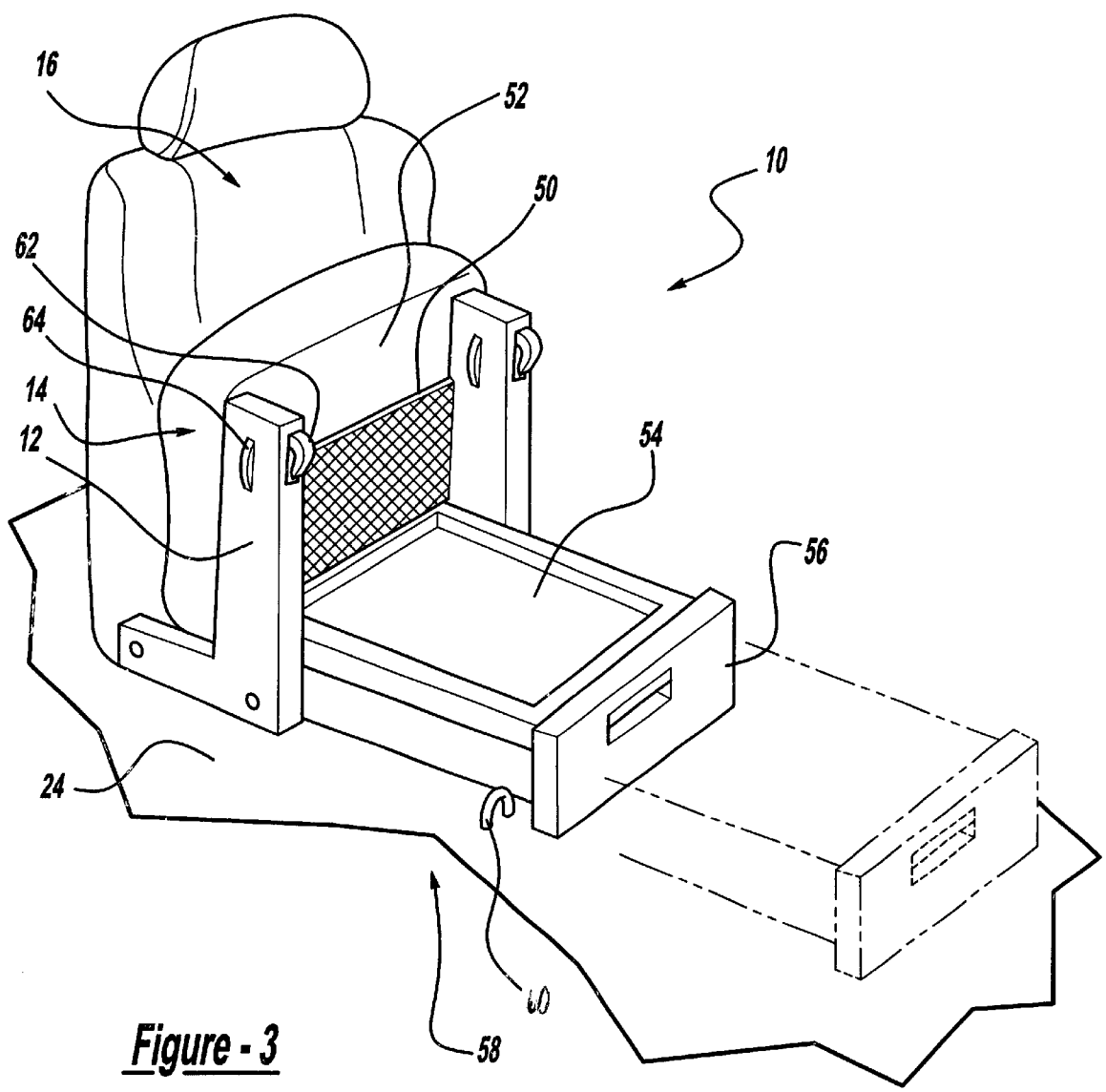
FIG. 3 is a perspective view of the seat assembly with the seat cushion in the generally vertical position.

As shown in FIG. 3, the seat assembly 10 preferably includes a storage pocket 50 fastened to an underside surface 52 of the seat cushion 14. The storage pocket 50 is accessible when the seat cushion 14 is pivoted into the generally vertical position. The storage pocket 50, like conventional map pockets, is preferably made from an elastic material, such as elastic netting. The storage pocket 50, however, may alternatively be made from other suitable materials.

The seat assembly 10 also preferably includes a storage tray 54 and a storage drawer 56. In the preferred embodiment, the storage tray 54 is removably fastened to the storage drawer 56, and the storage drawer 56 is slidably fastened to the floor 24 of the vehicle under the seat cushion 14. In this manner, the storage tray 54 may be accessible when the seat cushion 14 is pivoted into the generally vertical position, and when the seat cushion 14 is in the generally horizontal position if the storage drawer 56 is pulled into a deployed position. In an alternative embodiment, the storage tray 54 may be fastened or removably fastened to a storage drawer housing (not shown). In this manner, the storage tray 54 would be accessible only when the seat cushion 14 is pivoted into the generally vertical position. The storage tray 54 and the storage drawer 56 are made with conventional materials and from conventional methods.

The seat assembly 10 further preferably includes a latch mechanism 58 for selectively holding the seat cushion 14 in the generally horizontal position. The latch mechanism 58 preferably includes a first portion 60 connected to the floor 24 of the vehicle, a second portion 62 connected to the arm member 12, and a release handle 64 connected to the arm member 12. The first portion 60 and the second portion 62 of the latch mechanism 58 cooperate to selectively hold the seat cushion 14 in the generally horizontal position. The release handle 64 functions to release the second portion 62 from the first portion 60 and to allow pivotal movement of the seat cushion 14 from the generally horizontal position into the generally vertical position. As can be readily understood by a person of ordinary skill in the art, the latch mechanism 58 may include other suitable devices.

When the seat cushion 14 is pivoted into the generally vertical position, the weight of the seat back 16 and the specific design of the arm member 12 cooperate to selectively hold the seat cushion. 14 in the generally vertical position. As can be readily understood by a person of ordinary skill in the art, the seat cushion 14 can be selectively held in the generally vertical position by other suitable devices, such as a latch mechanism similar to the latch mechanism 58 for selectively holding the seat cushion 14 in the generally horizontal position.

The foregoing discussion discloses and describes a preferred embodiment of the invention, one skilled in the art will readily recognize from such discussion, and from the accompanying drawings and claims, that changes and modifications can be made to the invention without departing from the true spirit and fair scope of the invention as defined in the following claims.

I claim:

1. A seat assembly for a vehicle, comprising:
   a seat cushion having a sitting surface, a front portion, and a rear portion, said rear portion being adapted to engage the vehicle for pivotal movement about a first axis; and
   a seat back having a resting surface, a top portion, and a bottom portion, said bottom portion being connected to said rear portion of said seat cushion for rotational movement about a second axis, said second axis being displaced from and generally parallel with said first axis;
   wherein, when said seat cushion is pivoted about the first axis from a generally horizontal position to a generally vertical position, said front portion of said seat cushion is displaced in a rearward and upward direction, said bottom portion of said seat back is displaced in a rearward and downward direction, and said sitting surface and said resting surface become substantially adjacent;
   a storage tray fastened under said seat cushion, said storage tray being accessible when said seat cushion is pivoted into the generally vertical position; and
   a storage drawer slidably fastened under the seat cushion.

2. The seat assembly of claim 1 further comprising a storage pocket fastened to an underside surface of said seat cushion.

3. The seat assembly of claim 1 further comprising a latch mechanism having a first portion for engagement with the vehicle and a second portion connected to said seat cushion for selectively holding said seat cushion in the generally horizontal position.

4. The seat assembly of claim 3 wherein a rear portion of said seat cushion is for engagement with the vehicle.

5. A seat assembly for a vehicle, comprising:
   a seat cushion adapted to engage the vehicle for pivotal movement; and
   a seat back connected to said seat cushion for rotational movement;
   wherein, when said seat cushion is pivoted from a generally horizontal position to a generally vertical position, said seat back is displaced in a rearward and downward direction;
   a storage tray fastened under said seat cushion, said storage tray being accessible when said seat cushion is pivoted into the generally vertical position; and
   a storage drawer slidably fastened under the seat cushion.

6. The seat assembly of claim 5 wherein a front portion of said seat cushion is displaced in a rearward and upward direction when said seat cushion is pivoted into the generally vertical position.

7. The seat assembly of claim 6 wherein a sitting surface of said seat cushion and a resting surface of said seat back become substantially adjacent when said seat cushion is pivoted into the generally vertical position.

8. The seat assembly of claim 7 wherein said seat back is rotated from an angled position to an upright position when said seat cushion is pivoted into the generally vertical position.

9. The seat assembly of claim 5 wherein said rear portion of said seat cushion is for engagement with a floor of the vehicle.

10. The seat assembly of claim 9 wherein said rear portion of said seat cushion is for removable engagement with the floor of the vehicle.

11. The seat assembly of claim 5 further comprising a storage pocket fastened to an underside surface of said seat cushion.

12. The seat assembly of claim 5 further comprising a latch mechanism having a first portion connected to the vehicle and a second portion connected to said seat cushion for selectively holding said seat cushion in the generally horizontal position.

13. The seat assembly of claim 5 further comprising an arm member having a first end section connected to said seat back, a middle section capable of engaging the vehicle, and a second end section connected to said seat cushion.

14. A seat assembly for a vehicle, comprising:

a seat cushion;

first connector means for connecting said seat cushion to the vehicle and for allowing pivotal movement of said seat cushion from a generally horizontal position to a generally vertical position;

a seat back; and second connector means for connecting said seat back to said seat cushion and for allowing displacement of said seat back in a generally rearward and downward direction when said seat cushion is pivoted into the generally vertical position, said second connector means keeping said seat back in a generally vertical position when said seat cushion is pivoted into the generally vertical position.

15. The seat assembly of claim 14 further comprising first latch means for selectively holding said seat cushion in the generally horizontal position.

16. The seat assembly of claim 15 further comprising second latch means to selectively holding said seat cushion in the generally vertical position.

* * * * *